March 12, 1963  L. C. ERICKSON  3,080,986
LOADING STRUCTURE FOR SKIP CARS AND THE LIKE
Filed Sept. 14, 1960  4 Sheets-Sheet 1

INVENTOR.
LEWIS C. ERICKSON
BY
Everett J. Schroeder
ATTORNEY

March 12, 1963 L. C. ERICKSON 3,080,986
LOADING STRUCTURE FOR SKIP CARS AND THE LIKE
Filed Sept. 14, 1960 4 Sheets-Sheet 2

INVENTOR.
LEWIS C. ERICKSON
BY
Everett J. Schroeder
ATTORNEY

March 12, 1963

L. C. ERICKSON 3,080,986

LOADING STRUCTURE FOR SKIP CARS AND THE LIKE

Filed Sept. 14, 1960

INVENTOR.
LEWIS C. ERICKSON

BY
Everett J. Schroeder
ATTORNEY

March 12, 1963 L. C. ERICKSON 3,080,986
LOADING STRUCTURE FOR SKIP CARS AND THE LIKE
Filed Sept. 14, 1960 4 Sheets-Sheet 4

INVENTOR.
LEWIS C. ERICKSON
BY
Everett J. Schroeder,
ATTORNEY

United States Patent Office 3,080,986
Patented Mar. 12, 1963

3,080,986
LOADING STRUCTURE FOR SKIP CARS AND THE LIKE
Lewis C. Erickson, Duluth, Minn., assignor to National Iron Company, Duluth, Minn., a corporation of Delaware
Filed Sept. 14, 1960, Ser. No. 55,905
7 Claims. (Cl. 214—38)

This invention relates to mining and has special reference to skip loading structures for open pit mines where materials mined are hauled from the pit in skips or the like, such as are shown in my United States Patents No. 2,659,502 and 2,700,482.

The use of skip systems in open pit mining has sharply reduced the operating costs of those pits which have converted to this haulage method. However, there have been certain poblems to open pit skip haulage which have not permitted reaching the ultimate in savings which seem to be possible. The problems have been primarily in finding a means for loading the skins promptly when they arrive at their loading point without the need for closely cycling the trucks, which hauls the material from the power shovel, to the operating cycle of the skips. In addition, there are problems in reducing the impact damage to equipment due to loading operations to absolute minimums, and in reducing or eliminating entirely the possibility of spill of the material while it is being transferred from the trucks to the skips.

It is, therefore, one of the principal objects of this invention to provide a loading structure which will eliminate the problems which have been encountered in open pit skip operations.

Another object of this invention is to provide a loading structure or station which will permit a truck to discharge its load into a temporary storage hopper even though the skip is not in loading position, so that the truck can continue operating at maximum efficiency by eliminating waiting time at the loading station when a skip is not in position to be loaded.

Another object is to provide a skip loading structure with a temporary storage hopper which can discharge its load into a skip as soon as the latter is in position to receive a load.

Another object is to provide a bridge-type loading structure which will permit the trucks to drive over the skipway to discharge their load so that one-way traffic can be maintained on the pit benches thereby reducing the possibility of truck accidents during their travel.

Another object is to provide a bridge-type loading structure which permits the trucks to drive over the skipway and which will permit the skips to pass under and through the loading structure so that more than one loading point can be provided along the skipway, and the skips may be loaded from more than one point along the skipway, thus permitting the length of truck-haul from their loading point to the skip, to be the shortest possible, in the deeper pits which may be operated or mined at several different levels during normal pit operation.

Another object of this invention is to provide a loading structure which will permit the trucks to reach their discharge point without the need for sharp turns or backing-up, thereby increasing the efficiency of the truck operation.

Another object of this invention is to provide a loading structure such as that outlined above which requires a minimum of headroom or height so that the cost of building, installing and maintaining the structure can be minimized.

Another object is to provide a loading structure which maintains minimum distances for material to drop from one unit to the other, thereby to minimize damage to the structure, its components, and the skips during normal operation.

Another object is to provide a loading structure which will practically eliminate the possibility of spillage of material as it is being dumped from one unit to the other.

Another more specific object of this invention shall be to provide a drive-over type loading structure, which will permit trucks to drive over the skipway, with a movable platform which forms a part of the truck driveway during the time the truck is driving on the loading structure, and which can be moved out of the way to expose the receiving hopper for the truck load, so that when a truck is in position to dump its load it may do so without further maneuvering.

Another specific object of this invention is to provide a loading structure with a moving driveway platform such as that mentioned above and with a temporary storage hopper which is movable with the said platform so that as the platform is moved out of the way of the truck dump, the storage hopper is brought into position to receive the load from the truck, and after the load has been received in the storage hopper, both the loaded hopper and the platform may be returned to the starting position which permits trucks to drive over the skipway.

These and other objects and advantages of the invention will become more apparent as the description proceeds.

In the accompanying drawing forming a part of this application:

Figure 1:
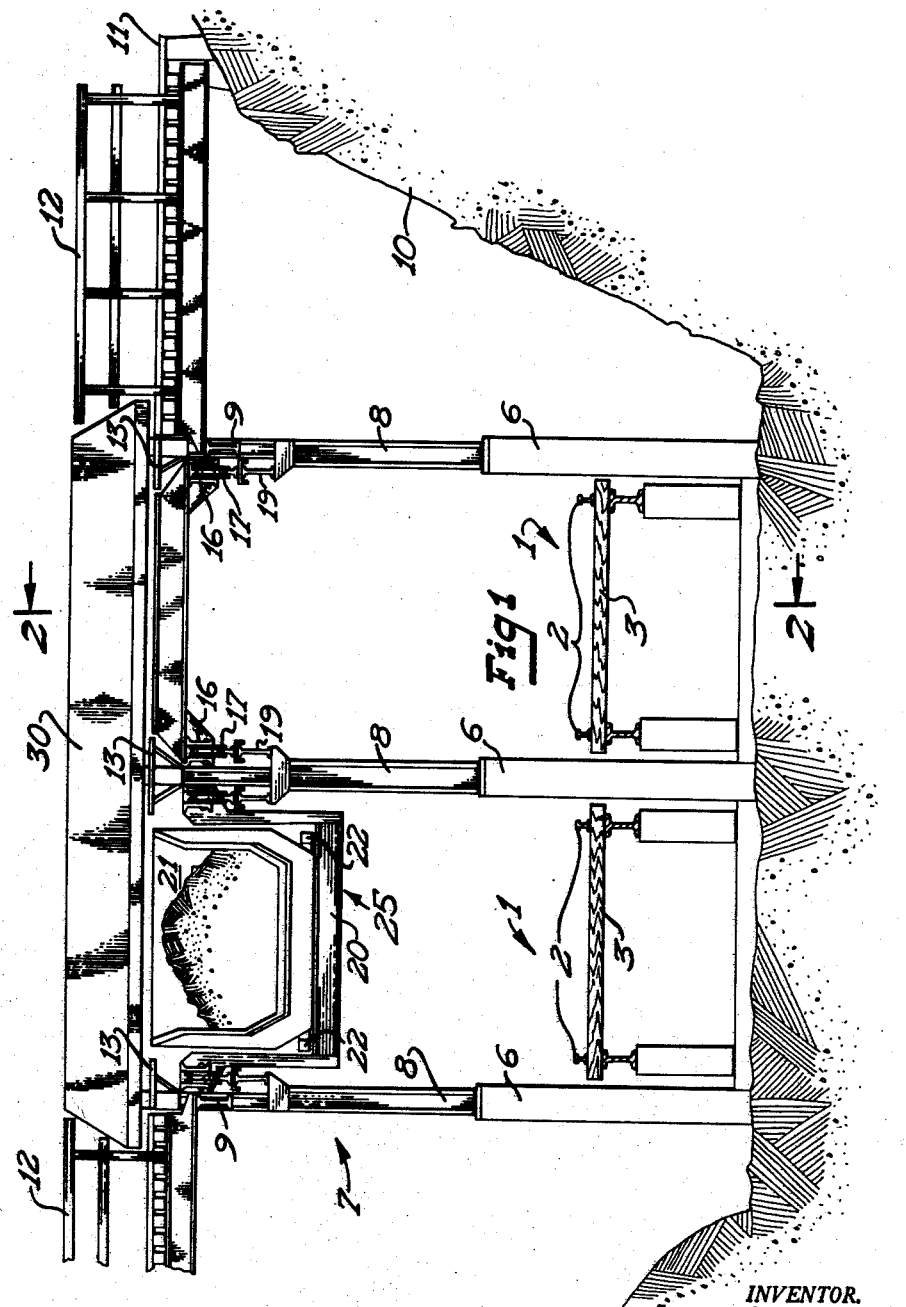
FIG. 1 is a rear elevational view of a loading structure made in accordance with my invention for a double skip operation.
Figure 2:
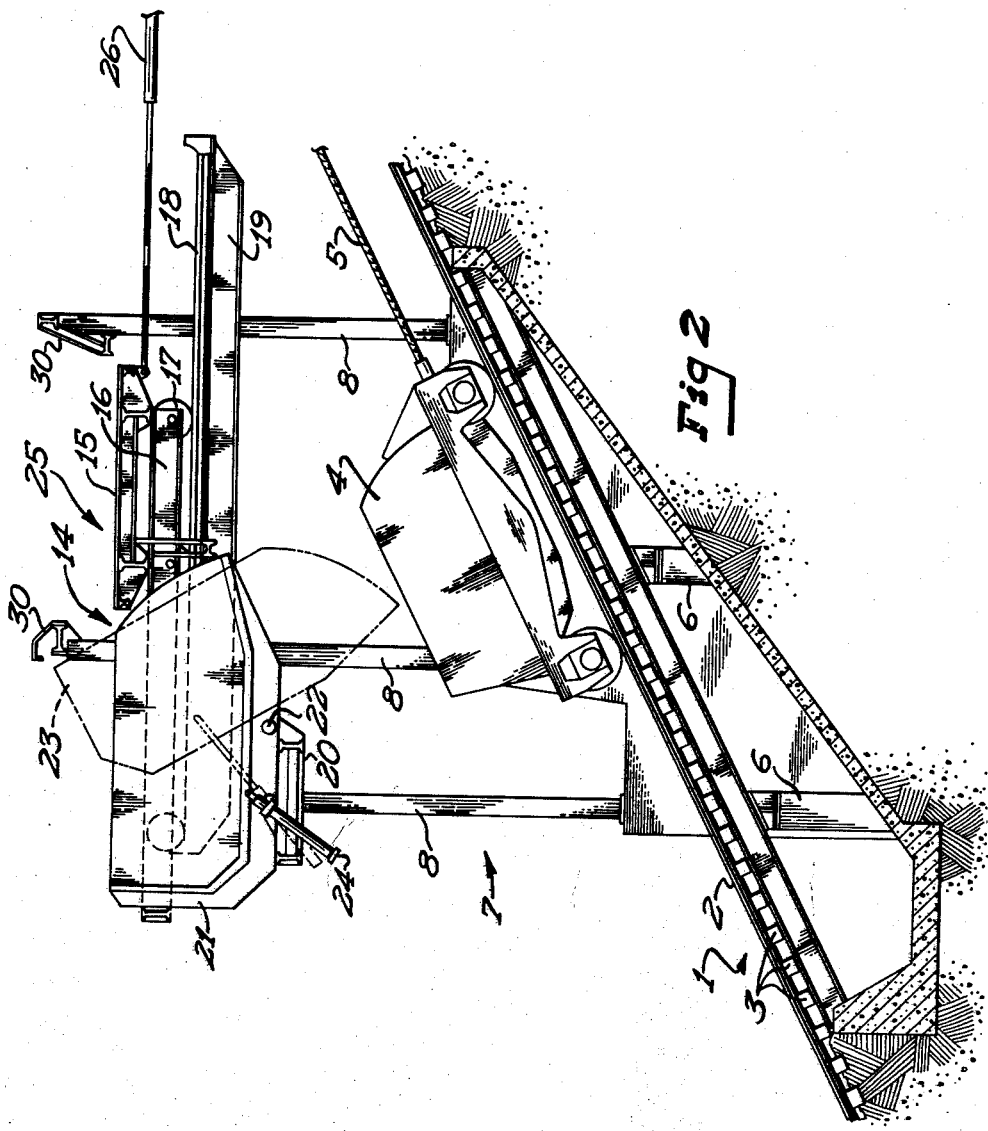
FIG. 2 is a sectional view on the line 2—2, FIG. 1, showing the truck driveway platform and the storage hopper in position for the trucks to drive over, and the hopper to be dumped. The dotted lines indicate the dumped position of the hopper.
Figure 3:
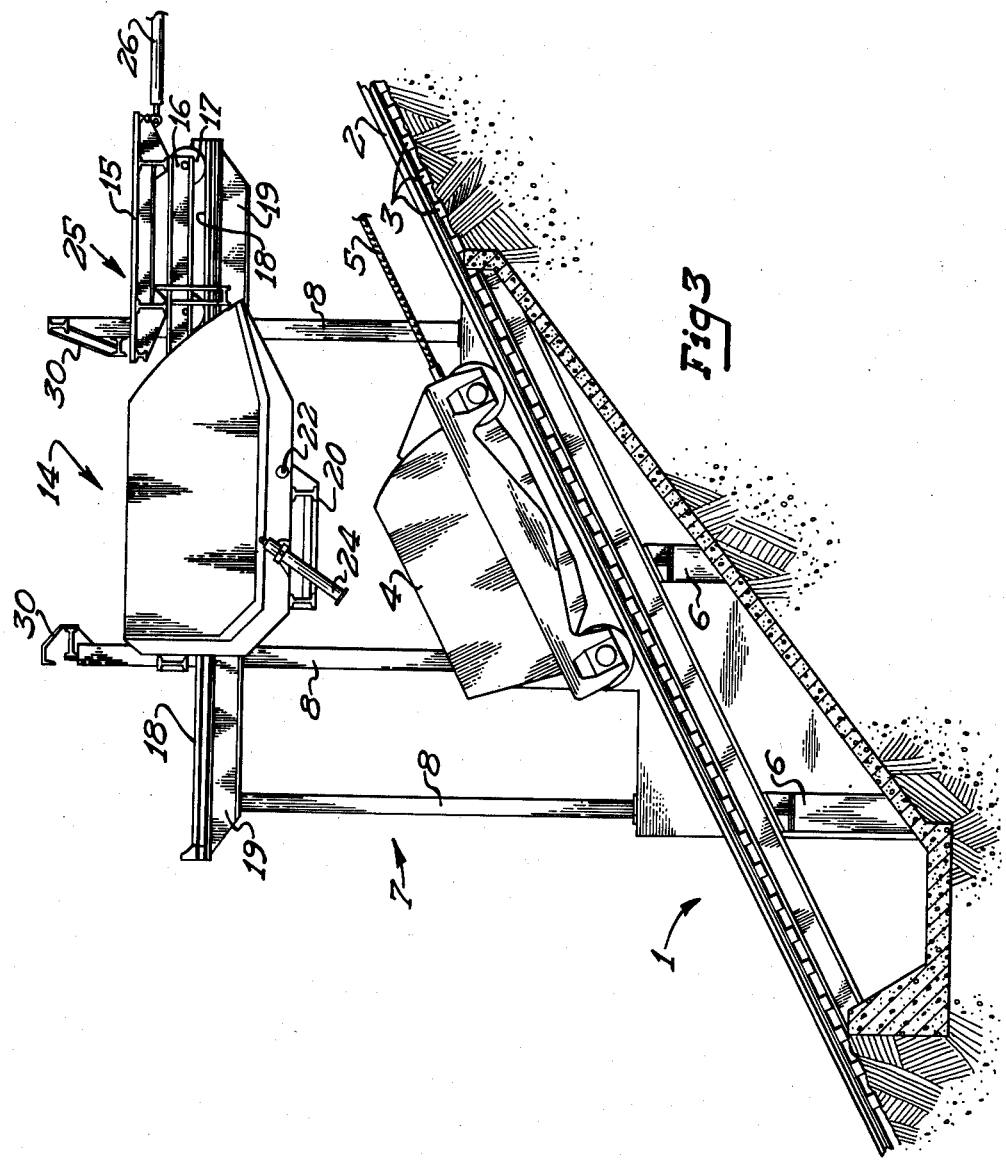
FIG. 3 is a view similar to FIG. 2 with the driveway platform and hopper in their opposite position wherein trucks can not traverse the loading structure, but trucks in dumping position can discharge their load into the hopper.
Figure 4:
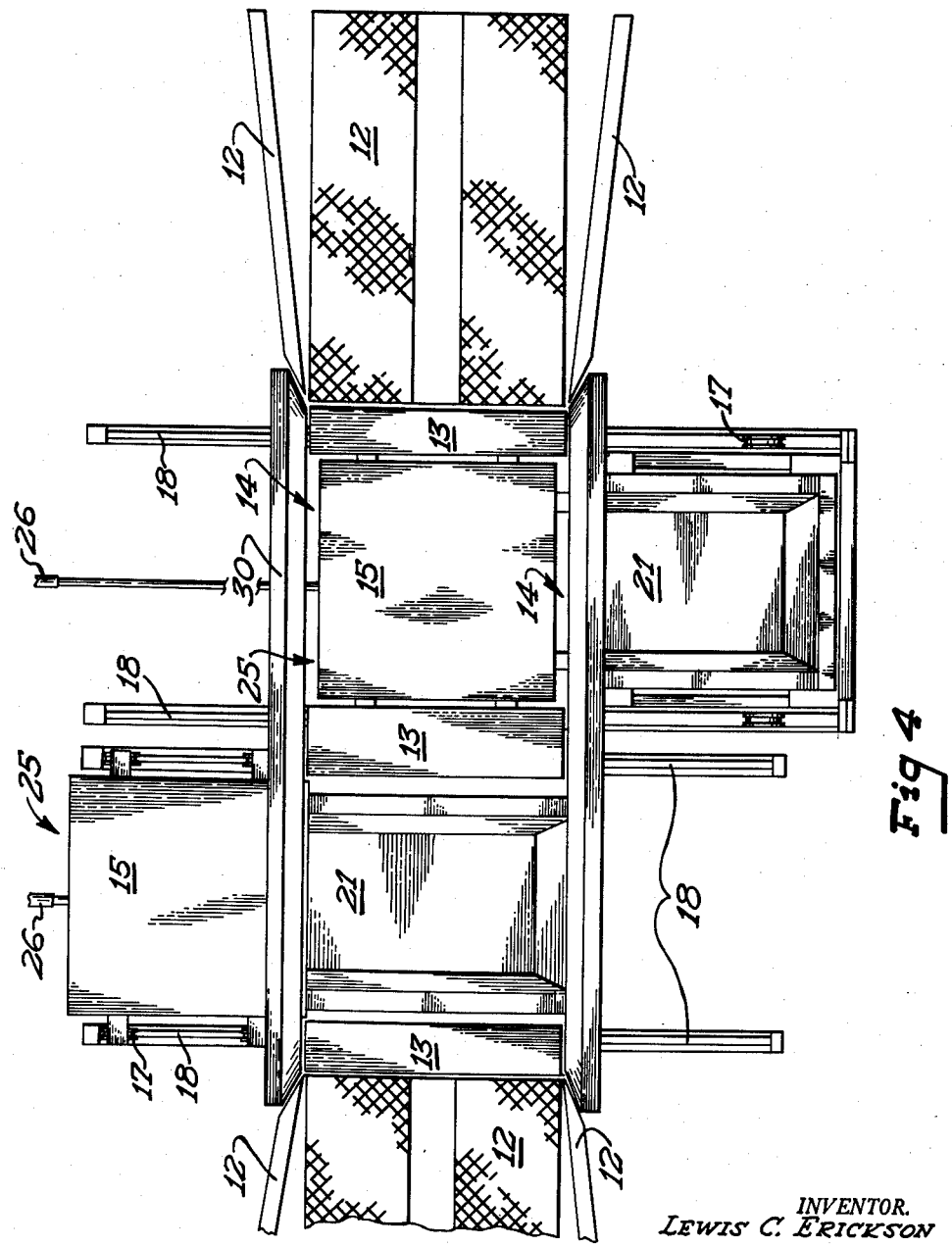
FIG. 4 is a top plan view of FIG. 1.

In the drawing, the reference numeral 1 indicates generally the skipway which includes tracks 2—2 mounted on suitable mountings such as ties 3—3. The skipway for open pit mines is on any suitable incline, as can be seen on the drawing, and the skips 4 are hoisted and lowered on the track by means of a cable 5 attached to the skips which is wound and unwound by a suitable hoist, nor shown, which are common to mining operations. My above mentioned patents describe the operation of open pit skip systems, and it is deemed unnecessary to repeat this description here.

The numeral 6 indicates the foundations for the loading structure 7 which foundations may be of any suitable design to fit the needs of any given open pit mining operation, ground conditions, angle of inclination, load conditions, and the like.

The loading structure comprises, preferably, a fabricated steel structure including suitable columns 8, beams 9, and cross-bracing to make a rigid and sturdy bridge over the skipway 1, spanning a cut 10 in the pit bench 11 which forms a slot for the skipway through the bench. It will usually be necessary to provide short bridges 12—12 spanning the space between the upper edge of the cut 10 and the vertical columns 8 adjacent the cut, as shown, to provide a roadway along the bench and on to the loading structure. The upper surfaces of the bridges 12 and the fixed or stationary upper surfaces 13 of the loading structure are in substantially the same plane as the bench so that they will form a continuation of the upper surface of the bench 11 and form a part of the roadway or haulroad on the bench so that trucks will be able to travel along the bench, and over the loading structure in either direction. The bridges 12 and the roadway portion of the loading structure are preferably of such a width that they provide a single lane for travel thereover, precluding the possibility of two trucks traveling over the structure at the same time.

As may be clearly seen in the drawing, the loading structures upper surface is provided with two large openings 14—14 which are closed by means of the movable platforms 15—15 to permit vehicles to travel over the skipway from one edge of the cut 10 to the other. The platforms are of suitable strength to support the weight of any vehicle which is contemplated to traverse them, of course.

Each of the platforms are mounted on supporting members or beams 16—16, which in turn are supported on suitable wheels 17—17 which ride on the track 18—18. The track 18—18 preferably extends transversely of the roadway across the bench, and in line with the skipway 1, as shown, and is supported on suitable beams 19—19 which are rigidly fixed to the structural steel members of the loading structure.

The members 16—16 are suitably connected together to maintain rigidity, and are of suitable length, as shown, to form a part of the supporting structure 20 for the storage hopper 21. The upper edges 21a of the hopper are at substantially the same level as the vehicle supporting surface 15a of its associated platform 15. The hopper 21 is connected to its supporting structure 20 by a pivot 22 so that it may be pivoted or tilted to dumping position as shown in dotted lines at 23 to discharge its load into a waiting skip positioned below it on the skipway. Hydraulic cylinders 24 may be used to dump the hopper; any suitable power unit, not shown, may supply the operating power.

The platforms 15—15 and the hoppers 21—21 are carried by the same supporting structure on the wheels 17—17 and this supporting structure forms a carriage 25—25 on wheels which permits the hoppers and the platforms to be moved together along the rail or track 18—18 from the truck travel position to the truck dump position as shown in the drawings. The carriage 25 may be moved from one position to the other by any suitable means, such as long travel hydraulic cylinders 26—26, a rack and pinion arrangement, or the like.

Side guide rails 30—30 are provided above the platforms and roadway portions of the loading structure and bridges to keep trucks substantially centered on the roadway of the loading structure.

In operation, the arrangement shown permits trucks to traverse the cut through the bench when the platforms are in position to close the openings 14—14, and it permits them to dump their loads into either hopper which may be empty by stopping in position adjacent to the opening serving the empty hopper as shown. As soon as the truck arrives and is in position to dump, an operator, not shown, moves the carriage 25 to bring the hopper into its load receiving position which simultaneously moves the platform out of the way so that the truck may be dumped. It is contemplated that a maximum of five seconds will be required to move the carriage with the empty hopper into load receiving position or truck dump position. After the truck has dumped its load into the hopper 20 it can immediately drive forward, off of the loading structure to obtain another load. The truck does not have to wait for the platform 15 to be returned to position to close the opening 14.

When the hopper has received the truckload, the operator, not shown, returns the hopper and platform to the position where trucks may traverse the loading structure roadway and the hopper may be dumped. It is contemplated that a maximum of seven seconds may be required to accomplish this move.

All of the above operations may be performed while the skip 4 is en route either up or down on the skipway, so that the trucks are not delayed in their haulage operation, or, if by chance a skip should be in its loading position under the loading structure, the operation can be performed equally well without interference.

When a skip 4 reaches its loading position under a loaded hopper, the operator, not shown, may initiate the dumping of the hopper into the skip by operating a suitable control mechanism, not shown, which will activate the cylinders 24. As soon as the skip receives its load, the skip hoisting cycle can be initiated immediately, and completed without regard for the truck cycling.

It should be noted that there is clearance under all of the structure over each skipway track (see FIGURE 1) so that the skip may travel all the way through beneath the loading structure and travel in either direction on the skipway beneath the platforms. This arrangement makes it possible to have more than one loading point along the skipway so that the skips may be loaded and operated from more than one loading point in the pit as required during the operation of the mine. This is a very desirable feature in large and deep open pit mines where mining is done at different elevations in the pit during normal operations, and it is desirable to keep the horizontal haulage distance as well as the vertical lift required of the trucks to a minimum in order to obtain maximum efficiency in the mining operation.

It should also be noted that the arrangement here shown and described permits the use of multiple loading stations in a mine and still the headroom requirements of the loading structure are kept to a minimum. This keeps the cost of the structure down, obviously, and it also provides a loading structure wherein the possibility of damage to the storage hopper and to the skips is kept to an absolute minimum for the flexibility that is obtained in the operation of the skip system with this loading structure. The distance material drops from the truck bed to the hopper is no more than is required to permit a full truck load to be received in the hopper and, the hopper is so pivoted as at 22 to permit the discharge lip 27 of the hopper 20 to be lowered as close to the skip as possible during the hopper dumping operation (see dotted lines 23) so that the drop of material as it is discharged from the hopper to the skip is kept to a minimum. The pivot point 23 is on the under side of the hopper, as shown, and at a point where the hopper is substantially balanced on the pivot point so that very little effort is required to tip it to dump position, and at the same time the lowering of the lip 27 is accomplished to minimize possible damage from impact.

Obviously, these features are of great importance and interest to mine operators as it will minimize their operating and maintenance costs, making for greater profits from the operation.

In addition, it should be noted that the hopper design and its position when in load receiving position are such that there can be practically no spillage of material dumped. It should also be noted that the hopper is of such a design and is tipped in such a manner that the material is lowered directly into the skip body with least possible chance of spillage. Spillage of material on to the tracks causes a clean-up problem, of course, which increases costs, and also, if a large particle were to land strategically on the skipway it might cause skip derailment which could result in down-time and possible damage to equipment, another costly item.

The foregoing description is given for clearness of understanding of the invention, and no unnecessary limitations should be understood therefrom, and the appended claims should be construed as broadly as possible in view of the prior art.

Having thus described my invention, what I claim is:

1. A loading structure for loading material into skips and the like which travel on an incline to transport said material along said incline, comprising: a bridge extending transversely over said incline and forming a roadway on which material hauling vehicles may travel over said incline and said skips to travel along said incline thereunder and having an opening disposed above said incline, a movable platform forming a part of said roadway, platform operating means for moving said platform to expose said opening in said roadway to permit material from said vehicles to be discharged thereinto, a hopper having upper edges at substantially the same level as said platform mounted on said bridge in such a position as to be exposed to receive material discharged from said vehicles only when said platform is moved to expose said opening, pivotal mounting means for said hopper to permit the latter to be tilted to discharge material into said skip, and means carried by said bridge for so tilting said hopper.

2. The structure as set forth in claim 1 and said pivotal mounting means being located adjacent the under side of said hopper to permit the discharge end of said hopper to be lowered substantially during the discharge of material into said skip.

3. The structure as set forth in claim 1 and including a carriage which is movable on said bridge, said platform and said hopper being supported side by side on said carriage and being movable therewith whereby they move together and alternately may be placed in said opening.

4. A structure for loading material into a skip or the like which travels on an incline comprising: a bridge extending over said incline and forming a roadway on which loads may be hauled over said incline and having an opening disposed above said incline, a movable platform forming a part of said roadway within said opening, platform operating means for moving said platform to expose said opening in said roadway to permit material to be discharged thereinto from vehicles on said roadway, and hopper means movably mounted on said bridge to receive loads from vehicles located on said roadway, said hopper means being connected to said platform and moving therewith into and out of said opening as said platform moves out of and into said opening respectively.

5. A loading structure for a skip which operates on an inclined skipway comprising: a bridge-type structure extending transversely over said inclined skipway to form a roadway to permit haulage vehicles to move over said skipway and having an opening disposed above said skipway, a movable platform carried by said structure and forming a part of said roadway across said opening, platform operating means for moving said platform transversely of said roadway into a position to form said roadway and out of said position to expose said opening through said roadway to permit loads to be dumped thereinto from said vehicles, and tiltably mounted hopper means adjacent to said opening to receive and hold loads dumped from said vehicles, said hopper means being tiltable to cause a load contained in said hopper to be discharged therefrom and into said skip, and movable mountings supporting said hopper which are operable to move said hopper into a position relative to said opening whereby loads may be dumped thereinto and to move said hopper transversely of the roadway out of position relative to said opening to a location where loads in said hopper may be discharged into a skip.

6. A loading structure for a skip which operates on an inclined skipway comprising: a bridge-type structure extending transversely over said inclined skipway to form a roadway to permit haulage vehicles to move over said skipway and having an opening disposed above said skipway, a movable platform carried by said structure and forming a part of said roadway across said opening, platform operating means for moving said platform transversely of said roadway into a position to form said roadway and out of said position to expose said opening through said roadway to permit loads to be dumped thereinto from said vehicles, and tiltably mounted hopper means adjacent to said opening to receive and hold loads dumped from said vehicles, said hopper means being tiltable to cause a load contained in said hopper to be discharged therefrom and into said skip, and a movable carriage, said platform and said hopper being connected in side-by-side relation and supported on said carriage and being movable therewith whereby they move together and alternately may be placed in said opening.

7. A loading structure for a skip which operates on an inclined skipway and has upper edge portions defining an open top, comprising
   (a) a bridge-type structure extending transversely over said inclined skipway to form a roadway to permit haulage vehicles to move over said skipway and having an opening disposed above said skipway through said roadway,
   (b) a hopper having an open top to receive material thereinto through said opening and having discharge defining portions over which such material may be discharged,
   (c) said discharge defining portions and the discharge defined thereby facing uphill relative to the inclined skipway,
   (d) pivotal mounting means pivotably mounting said hopper for tilting movement about an axis transverse to said skipway,
   (e) means for controllably tilting said hopper to and from a normally substantially horizontal load-receiving position and an inclined uphill facing discharge position,
   (f) said mounting means supporting said hopper in position such that said hopper is in remotely vertically spaced relation to the skip on said skipway while said hopper is in load-receiving position, said spaced relation permitting a loaded skip to pass under said hopper when the latter is in its load-receiving position,
   (g) said mounting means supporting said hopper in position such that said discharge defining portions of said hopper move downwardly into close vertical proximity to the upper edge portions of the skip when said hopper is moved to discharge position,
   (h) movable platform means carried by said bridge-type structure and forming a part of said roadway, and
   (i) platform operating means for moving said platform means transversely of said roadway into a position to cover said opening and thereby complete said roadway and out of said position to expose said bridge-type structure opening to permit loads to be dumped therethrough and into said hopper from said vehicles.

References Cited in the file of this patent
UNITED STATES PATENTS

| | | |
|---|---|---|
| 1,117,777 | Brown | Nov. 17, 1914 |
| 1,234,998 | Anderson | July 31, 1917 |
| 1,368,456 | Robertson | Feb. 15, 1921 |
| 1,744,106 | Coll | Jan. 21, 1930 |
| 2,700,482 | Erickson | Jan. 25, 1955 |